United States Patent
Zilberman et al.

(10) Patent No.: US 12,456,558 B2
(45) Date of Patent: Oct. 28, 2025

(54) METHOD FOR CONCENTRATING LIQUID RADIOACTIVE WASTE

(71) Applicant: STATE ATOMIC ENERGY CORPORATION "ROSATOM" ON BEHALF OF THE RUSSIAN FEDERATION, Moscow (RU)

(72) Inventors: Boris Jakovlevich Zilberman, Saint-Petersburg (RU); Dmitry Viktorovich Ryabkov, Saint-Petersburg (RU); Nadezhda Evgenievna Mishina, Saint-Petersburg (RU); Nikolay Alekseevich Dedov, Saint-Petersburg (RU); Artem Iurevich Nikolaev, Saint-Petersburg (RU); Ekaterina Viktorovna Andreeva, Saint-Petersburg (RU); Irina Vladimirovna Blazheva, Moscow (RU); Konstantin Viktorovich Kostromin, Yekaterinburg (RU); Andrei Yur'evich Shadrin, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 777 days.

(21) Appl. No.: 17/757,094

(22) PCT Filed: Oct. 1, 2020

(86) PCT No.: PCT/RU2020/000510
§ 371 (c)(1),
(2) Date: Jun. 9, 2022

(87) PCT Pub. No.: WO2021/118402
PCT Pub. Date: Jun. 17, 2021

(65) Prior Publication Data
US 2023/0005633 A1    Jan. 5, 2023

(30) Foreign Application Priority Data
Dec. 11, 2019 (RU) ............................... 2019141171

(51) Int. Cl.
*B01D 1/00*    (2006.01)
*G21F 9/08*    (2006.01)

(52) U.S. Cl.
CPC ............. *G21F 9/08* (2013.01); *B01D 1/0094* (2013.01)

(58) Field of Classification Search
CPC ................................ B01D 1/0094; G21F 9/08
See application file for complete search history.

(56) References Cited

U.S. PATENT DOCUMENTS 3,933,576 A * 1/1976 Rushton .................. B01D 1/12
                                                 159/901
4,040,973 A * 8/1977 Szivos ...................... G21F 9/22
                                                 261/119.1
(Continued)

FOREIGN PATENT DOCUMENTS

RU      2408101 C2    12/2010
RU      2596816 C1    9/2016

OTHER PUBLICATIONS

IP com Machine Translation of RU2596816 Obtained May 8, 2025. (Year: 2025).*

(Continued)

*Primary Examiner* — Jonathan Miller
(74) *Attorney, Agent, or Firm* — Perilla Knox & Hildebrandt LLP; Kenneth A. Knox

(57) ABSTRACT

The present disclosure relates to nuclear chemical, particularly radiochemical, technologies at different stages of the nuclear fuel cycle, such as the production of purified nuclear materials (uranium, zirconium) or the reprocessing of spent nuclear fuel from nuclear power stations, in which extraction (Continued)

processes and operations for purifying nuclear materials are used. An example method, which includes the partial decomposition of nitric acid during continuous evaporation while a solution containing a reducing agent is fed into the bottom part of an evaporator having a circulating bottoms solution, consists in that the process is carried out such that the solution is kept in the bottom part of the evaporator for more than 2 hours under the addition of an aqueous solution of formaldehyde and formic acid (hereinafter "the mixture") or a solution of formic acid after the process has been started using the mixture.

7 Claims, 1 Drawing Sheet

(56) References Cited

U.S. PATENT DOCUMENTS

| | | | | |
|---|---|---|---|---|
| 4,139,420 A * | 2/1979 | Stunkel | ............ | G21F 9/08 203/DIG. 19 |
| 4,444,680 A * | 4/1984 | Kitzes | ............ | G21F 9/08 588/20 |
| 5,160,636 A * | 11/1992 | Gilles | ............ | C02F 1/26 210/806 |
| 5,468,347 A * | 11/1995 | Bruggeman | ............ | G21F 9/06 203/79 |
| 8,354,567 B2 * | 1/2013 | Leavitt | ............ | G21F 9/10 588/317 |
| 2011/0002823 A1 * | 1/2011 | Miguirditchian | .. | B01D 11/0488 423/9 |
| 2012/0101324 A1 * | 4/2012 | Leavitt | ............ | G21F 9/12 588/18 |

OTHER PUBLICATIONS

Y. Kondo, "Development of a safety denitration method to remove nitric acid from mixtures", Journal of Radioanalytical and Nuclear Chemistry, Akademiai Kiado RT, HU, vol. 240, No. 1, Apr. 1, 1999, pp. 123-136. (Year: 1999).*

Zilberman B.Ya., Saprykin V.F., Makarychev-Mikhailov M.N. Management of high level wastes (HL W) from nuclear power plant spent fuel reprocessing in terms of tritium localization and nitric acid regeneration. 1993'Int. Conf. on Nuclear Waste Manag. and Environ. Remediation. (Proc. Conf. Prague, 1993). vol. 1, p. 375-378. Am. Soc. 5 Mech. Engineers, N-Y, 1993.

Warner B.F. Operational experience in the evaporation and storage of highlyactive fission-product wastes at Windscale / Management of Radioactive Wastes from Fuel Reprocessing (Proc. Symp.Paris, 1972), OECD/NEA, Paris, 1973, p. 339.

Miura N., Watahiki M., Nakamura Yo. 15 E et al. Operation experience and anti-foam study at the Tokai reprocessing plant. Proc. Int. Conf. GLOBAL'97 (Jap.), v. 2, p. 1238-1243].

Schneider J., Bretault Ph., Masson 25 M., Juvenelle A., Bosse E., Huel C. Highly Active Liquid Waste concentration using the formaldehyde denitration process in the French reprocessing plants. Proc. Intem. Conf. "Global 2009" (Paris, France, Sep. 6-11, 2009). CEA, 2009. Paper 9343].

Fuel reprocessing Reactor Hand-book, v.2, Eds Stoller S.M., Richards R.B. Interscience Publishers. N-Y, London, Toronto, 1964, Russian Ed., p. 223).

Fuel reprocessing Reactor Hand-book, v.2, Eds Stoller S.M., Richards R.B. Interscience Publishers. N-Y, London, Toronto, 1961, p. 179).

International Search Report for International Application No. PCT/RU2020/000510 mailed Jun. 17, 2021.

Written Opinion for International Application No. PCT/RU2020/000510 mailed Jun. 17, 2021 (Machine-Translation Provided).

* cited by examiner

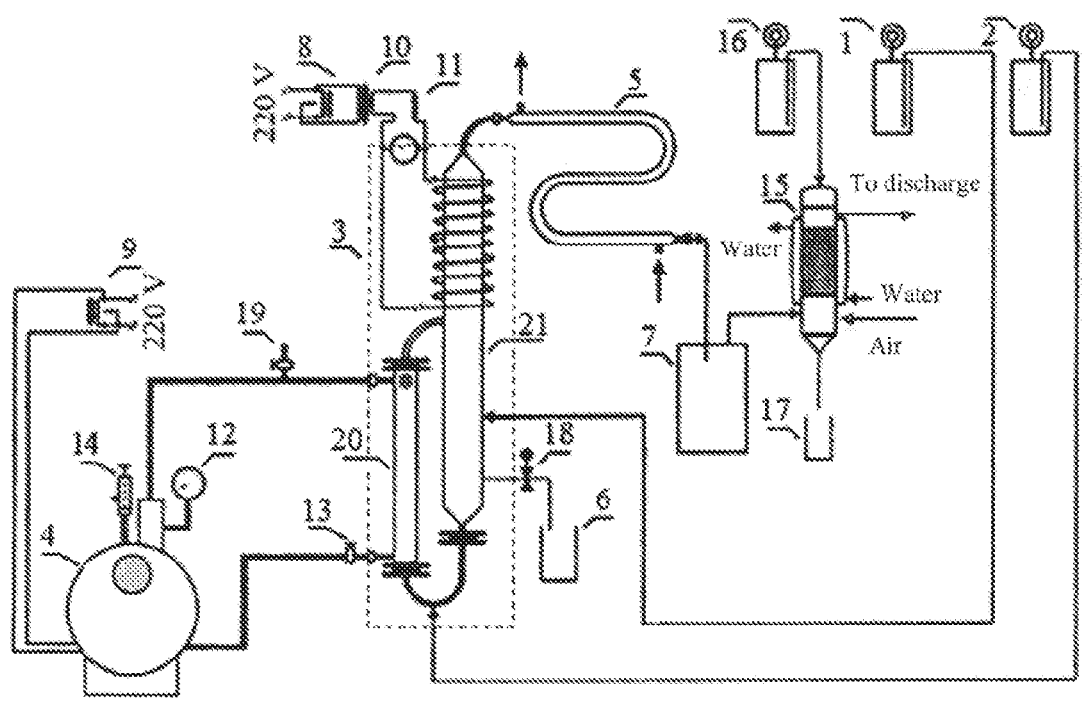

METHOD FOR CONCENTRATING LIQUID RADIOACTIVE WASTE

CROSS-REFERENCE TO RELATED APPLICATION

The present disclosure is a national phase application under 35 U.S.C. § 371 of International Application No. PCT/RU2020/000510 filed Oct. 1, 2020, which claims the benefit of and priority to Russian Patent Application No. 2019141171 filed Dec. 11, 2019, the contents of which being incorporated by reference in their entireties herein.

TECHNICAL FIELD

The present disclosure relates to the field of nuclear chemical and, in particular radiochemical, technologies at different stages of the nuclear fuel cycle (NFC), such as production of purified nuclear materials (uranium, zirconium) or reprocessing of spent nuclear fuel from nuclear power stations (NPS SNF), wherein extraction operations are used for purifying nuclear materials.

BACKGROUND

Such production processes, which are based on extraction of target elements with diluted tributyl phosphate (TBP) from nitric acid solutions, generate a rather high specific volume of nitric acid raffinates which require concentrating by evaporation with regeneration of working medium components and, subsequently, localization of solid waste. Among this waste, the highly active raffinate from the first extraction cycle of the PUREX process is of special importance both from the point of a specific radioactivity level and from the point of its content of fission product nitric salts, the higher being burnup of spent nuclear fuel, the more important being these aspects.

The related art discloses a method of concentrating raffinates comprising evaporation of a highly active raffinate (HAW) simultaneously with distillation of nitric acid, condensation of the distillate thus produced, its subsequent evaporation for purification from aerosol contamination with radionuclides mixed with MAWs, also with nitric acid distillation and its subsequent rectification at the final stage of the process [Fuel reprocessing (Reactor Hand-book, v.2). Eds Stoller S. M., Richards R. B. Interscience Publishers. N-Y, London, Toronto, 1961, p. 179], wherein evaporation operations are usually carried out in an evaporator having an external heating chamber and natural circulation of the bottoms solution. However, evaporation according to this scheme is applicable without limitation only to refining cycle raffinates, while, for a highly active raffinate, concentration is limited by impurity salts present that are weakly soluble in nitric acid at its high concentration in the evaporation bottoms solution. In particular, when evaporating a highly active raffinate from reprocessed NPS SNF (HAW), such impurity is a heavy barium nitrate sediment clogging the circulation pipe. Recently, for this reason as well as due to the presence in great quantities s of tritium in HAW from reprocessed NPS SNF, the stages of concentrating HAW and MAW with regeneration of nitric acid contained therein have been separated to a fullest degree possible.

To increase solubility of barium nitrate during HAW evaporation various artificial techniques are used, in particular, dilution of the initial solution with the distillate from nitric acid regeneration [Zilberman B. Ya., Saprykin V. F., Makarychev-Mikhailov M. N. Management of high level wastes (HLW) from nuclear power plant spent fuel reprocessing in terms of tritium localization and nitric acid regeneration. 1993'Int. Conf. on Nuclear Waste Manag. and Environ. Remediation. (Proc. Conf. Prague, 1993). Vol. 1, p. 375-378. Am. Soc. Mech. Engineers, N-Y, 1993].

Further, the process may also be carried out in a semi-continuous mode in a convection apparatus with multi-tier coil pipes or a horizontal heating chamber, where sediment is accumulated in the bottom part and subsequently washed out (pulverized) [Warner B. F. Operational experience in the evaporation and storage of highly active fission-product wastes at Windscale/Management of Radioactive Wastes from Fuel Reprocessing (Proc. Symp.Paris, 1972), OECD/NEA, Paris, 1973, p. 339]. A modification of this process is HAW evaporation in a pan-type apparatus by heating through the coil pipe and simultaneous denitration of nitric acid by adding formic acid and its regeneration by oxidative absorption of nitrogen oxides [Miura N., Watahiki M., Nakamura Yo. E. et al. Operation experience and anti-foam study at the Tokai reprocessing plant. Proc. Int. Conf. GLOBAL'97 (Jap.), v. 2, p. 1238-1243]. This method has the following disadvantages: it is carried out in a semi-continuous mode with substantial accumulation of the bottoms solution, which is driven by the necessity to provide a large heating surface with a limited heat transfer through the "pan" walls and the coil pipe when it is impossible to arrange a tubular heating chamber, as well as, the necessity to initiate the process each time when it is restarted by way of adding a sodium nitrate solution to avoid an uncontrolled surge.

A modification of this process is a method used at UP-2 and UP-3 plants where instead of formic acid formaldehyde is used [Schneider J., Bretault Ph., Masson M., Juvenelle A., Bosse E., Huel C. Highly Active Liquid Waste concentration using the formaldehyde denitration process in the French reprocessing plants. Proc. Intern. Conf. "Global 2009" (Paris, France, 06-11.09.2009). CEA, 2009. Paper 9343]. The process does not require initiation and ensures more complete decomposition of nitric acid. However, as the inspection showed, the process comes with partial loss of nitric acid due to irreversible formation of nitrous oxide, without any description of required gas purification in the original.

A method closest to the claimed one is the method for concentrating radioactive waste described in Patent RU2596816 (Bull. 25, 2016), which is taken as the prototype. This method consists in incomplete decomposition of nitric acid with formaldehyde throughout continuous evaporation of the raffinate in an evaporation apparatus with an external heating chamber and circulation of the bottoms solution when a water solution of formaldehyde is fed to the apparatus bottom part at the ratio of 2 moles of formaldehyde to 1 mole of decomposed nitric acid entered with the feed solution.

However, in this method rather concentrated formaldehyde solutions (6.5 moles/L, i.e. twice diluted formalin) are used, which cannot ensure fire and explosion safety of radiochemical production facilities. Furthermore, it is established that the evaporation of a highly active raffinate allows to reduce an acidity of the bottoms solution, without formation of nitrous oxide, only to 3.8-4 moles/L (the total nitrate ion is by 1.7-2 moles/L higher), which is on the brink of barium nitrate crystallization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a layout of a bench-scale plant for evaporating of model solutions according to various embodiments of the present disclosure.

DETAILED DESCRIPTION

The technical problem the present disclosure is aimed at is to develop a method for concentrating radioactive waste, which would enable continuous evaporation of the waste with decomposition of nitrogen-containing reactants and which would be aimed at improving fire and explosion safety of production facilities.

The technical effect of the proposed method for concentrating radioactive waste consists in reducing the use of the fire-hazardous and explosive reactant in the continuous process of evaporating process waste due to a sharp reduction (up to 10 times) of the formaldehyde concentration in the reducing mixture and possible continuation of the process with the use of a formic acid solution with no formaldehyde.

This technical effect is achieved in a method for concentrating liquid radioactive waste resulting from extraction reprocessing of a highly spent nuclear fuel of a nuclear power station, comprising partial decomposition of nitric acid in the course of continuous evaporation of a solution, as fed to a bottom part of a circulation-type evaporator, comprising a reducing agent, wherein a mixture of formaldehyde and formic acid is used as the reducing agent, and wherein the process is carried out while aging the solution in the bottom part of the evaporator, feeding therein a water solution of the mixture of formaldehyde and formic acid or a solution of formic acid as the reducing agent in 3-5 hours after the start of the process with the use of the mixture of formaldehyde and formic acid.

The aging time period is at least 2 hours.

When starting the process, a solution of the formaldehyde/formic acid mixture is used with the maximum formaldehyde content of 6.5 moles/L, but not less than 0.65 moles/L, and its missing part is replaced with formic acid in the quantity of 2.2-2.7 moles of formic acid instead of 1 mole of formaldehyde.

The consumption of the reducing mixture in terms of formaldehyde is app. 0.3 moles per 1 mole of nitric acid in a RAW evaporated solution.

An evaporation degree, with due regard to dilution of the bottoms solution with the solution comprising the reducing agent, is limited by barium nitrate solubility at a nitric acid residual concentration in the bottoms solution not lower than 2.5 moles/L and a nitrate ion concentration not less than 4 moles/L that is created by nitric acid and fission product salts contained in the highly active raffinate from extraction reprocessing.

The solution comprising the reducing agent contains water in the quantity of at least 0.35 kg per 1 L of the solution.

These operations enable to select a mode wherein, when a model highly active raffinate with a given concentration degree is evaporated (a bottoms solution specific volume is not higher than 0.4 m$^3$/t of SNF), no barium nitrate precipitate is formed, and no nitrous oxide is released. However, in this case fire and explosion safety of the process increases due to a sharp (up to 10 times) reduction in the concentration of formaldehyde in the reducing mixture and possible continuation of the process with no formaldehyde.

The above description may be supported by examples obtained during the evaporating of model solutions at a bench-scale plant the layout of which is shown in FIG. 1. The plant comprises: 1—an initial solution weigh feeder, 2—a formaldehyde weigh feeder, 3—an evaporator, 4—a steam generator, 5—a condenser, 6—a weighing tank for receiving a bottoms solution, 7—a buffer tank for receiving a distillate, 8 and 9—laboratory variable autotransformers, 10—a transformer, 11—a fuse, 12—a manometer, 13—a valve for controlling discharge of heating steam condensate, 14—an emergency valve, 15—an absorber, 16—a weigh feeder of reflux to the absorber, 17—a tank for collecting regenerated nitric acid, 18—a solenoid valve for discharging a bottoms solution, 19—a valve for discharging steam to the atmosphere, 20—a heating chamber of the evaporator, 21—a separator of the evaporator.

The evaporation is carried out in equilibrium conditions while keeping a constant level of the bottoms solution and in conditions of reflux absence owing to electric heating of the separator (21) of the evaporator (3). The plant is equipped with an automated control system.

The initial solution containing 2.6 moles/L of HNO$_3$ is fed to the bottom part of the circulation tube, and the solution of formaldehyde and/or formic acid is fed under the bottoms solution surface above the level of its controlled withdrawal. The working volume of the bottoms solution is 160 mL.

The plant can be operated as follows:

After the required pressure is reached in the steam generator (4), the evaporator (3) is filled up with a "blanket" (a solution of a supposed equilibrium concentration of the bottoms solution). After the solution in the evaporator (3) boils, batch feeding of the initial solution and reactants starts. The initial solution and denitrating reactant are fed under the surface of the solution in the evaporator (3) with the use of the weigh feeders (1) and (2). In order to collect nitric oxides, the reflux liquid is fed, with the use of the weigh feeder (16), to the top of the absorber (15) onto a spiral dump packing. Air is fed under the packing to the absorber. The bottoms solution flowrate is measured with the use of the weighing tank (6) for receiving the bottoms solution. A preset evaporation degree is maintained with the use of the solenoid valve (18). The condenser (5) and the absorber (15) are cooled with running water.

The process is conducted in the automatic mode and is controlled by an ACS. All the data on the process is displayed on an operator console. A required evaporation coefficient, a coefficient of reactant consumption/initial consumption ratio, reflux liquid consumption for the absorber (15) are set on the operator console. The data on the current reactant consumption, the solution level and density in the evaporator (3), a steam pressure in the system, and a current electric power of the steam generator (4) are displayed on the console. The process of measuring the solution level in the evaporator (3) is continuous and is conducted in real time with the use of a hydrostatic densimeter/level meter. In order to maintain a permanent solution level in the evaporator (3), the ACS adjusts consumption of the initial reactant and the denitration reactant coupled thereto and, while proceeding from the preset evaporation degree, sets bottoms solution consumption automatically. The overall plant productivity is adjusted by changing power supplied to the steam generator, said power being set manually with the use of the laboratory variable autotransformer (9).

The proposed method is illustrated by Examples. The test results mentioned in Examples are tabulated.

EXAMPLES

Example 1

The evaporation of the test 2.6 moles/L nitric acid solution is conducted without feeding the solution comprising a reducing agent in the evaporator, as described above, with natural circulation of a bottoms solution, which is provided with a heating chamber having slightly reduced surface area $S_{rp}$=0.008 m² (instead of 0.01 m² according to the norms) with a minimal possible output of 0.45 L/h until circulation stops. The bottoms solution is aged in the evaporator bottom for 3.5 hours. Equilibrium acidity of the bottoms solution is 7.6 moles/L, but barium nitrate solubility limits it to the level of 4.8 moles/L.

Example 2

The process is conducted according to the prototype in the same evaporator with the output of 0.66 L/h, and twice diluted formalin (6 moles/L of formaldehyde) is fed to the evaporator bottom in the volumetric ratio of 0.085 to the initial solution. The process becomes unstable if undiluted formalin is fed or if the output is lower (episodic flooding, escape of a part of formaldehyde, and/or foaming of the bottoms solution during its withdrawal, loss of nitric acid). The bottoms solution is aged, with due regard to dilution with the solution comprising a reducing agent, for app. 1.3 hours. In the tested mode, the denitration effect is achieved and, in the continuous mode, the bottoms solution having acidity of 4.2 moles/L is obtained, but total loss of nitric acid is app. 15% due to partial formation of non-absorbed nitrous oxide.

Example 3

The process is conducted according to the prototype with the output of 0.35 L/h and the evaporation degree of 8 in the same evaporator after replacement of the heating chamber with a non-standard one having the heating surface $S_{rp}$=0.003 m², while feeding the solution comprising 6.5 moles/L of the formaldehyde reducing agent at the relative flowrate of 0.1. The bottoms solution is aged, with due regard to dilution of the reducing agent, for app. 2.3 hours. In the evaporation/denitration continuous mode, the bottoms solution is produced with acidity of 4.2 moles/L and without nitric acid loss.

Example 4

In the mode similar to that of Example 3, with the output of 0.22 L/h in the same evaporator, where the relative flowrate of the same reducing agent is 0.12 and the evaporation degree is ~11 (the bottom solution is aged for 3.5 hours), bottoms solution acidity of 2.7 moles/L of $HNO_3$ is achieved with the loss of 15%.

Example 5

The process is conducted according to the claimed method in the mode similar to that of Example 4, where a half of formaldehyde is replaced with time and a half quantity of formic acid; the bottoms solution is aged for app. 4 hours. The final bottoms solution acidity of 4.35 moles/L is achieved with full nitric acid balance.

Example 6

The process is conducted in the mode similar to that of Example 5; 70% of formaldehyde is replaced with twofold molar quantity of formic acid; the bottoms solution is aged for app. 4 hours; the final bottoms solution acidity of 4.15 moles/L is achieved with practically full nitric acid balance.

Example 7

The process is conducted in the mode similar to that of Example 6 with the replacement of three fourth of formaldehyde with formic acid in the 2.75 ratio; the bottoms solution is aged for app. 4 hours; the final bottoms solution acidity of 3.45 moles/L is achieved with not full nitric acid balance equal to 92%.

Example 8

The process is conducted in the mode similar to that of Example 7 with the replacement of 90% of formaldehyde with formic acid in the ratio of 2.2:1; the bottoms solution is aged for app. 4 hours; the final bottoms solution acidity of 3.6 moles/L is achieved with full nitric acid balance equal to 102%.

Example 9

The process is started in the mode similar to that of Example 7, and, after stationary conditions are achieved, a solution that comprises 17.5 moles/L of a formic acid reducing agent (monohydrate) without formaldehyde admixture for replacing formaldehyde in the 2.7:1 ratio is used. In the first stage of the process, parameters of Example 7 are reproduced within the limits of the experiment accuracy (~2-3%), and the bottoms solution acidity of 3.2 moles/L is achieved in the second stage with full (100%) nitric acid balance.

Attempts to use undiluted formic acid resulted in instability of the process (waning and surges, foaming, etc.).

Example 10

The process is conducted with a solution simulating a highly active raffinate resulted from the reprocessing of fast reactor SNF with the burnup of 100 GW*day/t, the solution has the following composition: $HNO_3$—2.65 moles/L, Fe—99 mg/L, Ni—188 mg/L, La—9.2 g/L and Ba—200 mg/L. At the start, a "blanket" comprising 10-fold concentrations of metals and 4 moles/L of $HNO_3$ is put in the evaporator bottom. While doing so the reducing agent solution of 2 moles/L of formaldehyde+9 moles/L of formic acid is fed, and the bottoms solution comprising 3.1 moles/L of $HNO_3$ is obtained, which is conditioned not only by the effect of the reducing agent, but also by the salting-out effect of nitrates of the above substances. Nitrogen balance is achieved practically in full (97%).

Example 11

The process is conducted in two stages as in Example 9, but with the solution of a highly active raffinate simulator. The process starts as in Example 10, i.e. with the feeding of the reducing agent solution comprising 2 moles/L of formaldehyde+9 moles/L of formic acid, i.e. by feeding the solution comprising the reducing agent, and continues with the feeding of 17.5 moles/L of formic acid. The first stage mode is reproduced rather well; in the course of the second stage, decay of nitric acid is achieved to the concentration of 2.5 moles/L; in this case no signs of nitrous oxide formation are observed. The acid balance in the second stage is 97% at the background of the flow balance of 98%.

Example 12

The process is conducted with the solution of a highly active raffinate simulator. The reducing agent comprising 0.65 moles/L of formaldehyde+13 moles/L of formic acid, and the bottoms solution of 2.65 moles/L of $HNO_3$ is produced. With such deep regeneration, the process is unstable (waning, surges, level instability, etc.), and the nitrogen balance is 86%.

TABLE

Examples of continuous evaporation of a HAW simulator with denitration (initial solution comprises 2.6 moles/L of $HNO_3$),

| Example | $S_{rp}$, m² | Initial solution flowrate, L/h | $H_2CO + H_2COO$ Flow-rate, L/h | $H_2CO + H_2COO$ Concentration, moles/L | Bottoms solution Flow-rate, L/h | Bottoms solution $HNO_3$, moles/L | Bottoms solution $\Sigma NO_3$ moles/L | Distillate Flow-rate, L/h | Distillate $HNO_3$, moles/L | Absorber reflux liquid Flow-rate, L/h | Absorber reflux liquid $HNO_3$, moles/L | $HNO_3$ absorption, balance % | $HNO_3$ balance, % | Consumption balance, % |
|---|---|---|---|---|---|---|---|---|---|---|---|---|---|---|
| 1 | 0.008 | 0.44 | 0 | — | 0.045 | 7.6 | 7.6 | 0.40 | 2.0 | 0 | — | — | 101 | 100 |
| 2 | 0.008 | 0.69 | 0.061 | 6.0 + 0 | 0.065 | 4.2 | 4.2 | 0.70 | 1.38 | 0.2 | 1.45 | 17 | 85 | 102 |
| 3 | 0.003 | 0.349 | 0.0352 | 6.5 + 0 | 0.042 | 4.2 | 4.2 | 0.345 | 1.4 | 0.12 | 2.0 | 26.5 | 99 | 103 |
| 4 | » | 0.215 | 0.0267 | 6.5 + 0 | 0.0202 | 2.7 | 2.7 | 0.217 | 1.52 | 0.13 | 0.94 | 24 | 87 | 98 |
| 5 | » | 0.172 | 0.0192 | 3.25 + 5 | 0.0176 | 4.35 | 4.35 | 0.165 | 1.7 | 0.120 | 0.70 | 19 | 99 | 97 |
| 6 | » | 0.181 | 0.0225 | 2.0 + 9 | 0.0182 | 4.15 | 4.15 | 0.0182 | 4.15 | 0.15 | 0.75 | 24 | 98 | 102 |
| 7 | » | 0.190 | 0.0232 | 1.63 + 13 | 0.0202 | 3.45 | 3.45 | 0.197 | 1.46 | 0.12 | 0.82 | 19 | 92 | 102 |
| 8 | » | 0.206 | 0.0264 | 0.65 + 16 | 0.0202 | 3.6 | 3.6 | 0.209 | 1.58 | 0.15 | 0.88 | 25 | 102 | 99 |
| 9 | » | 0.173 | 0.0226 | 0.65 + 16 | 0.0175 | 3.3 | 3.3 | 0.173 | 1.33 | 0.15 | 0.91 | 30 | 97 | 98 |
|  |  | 0.190 | 0.0238 | 0 + 17.5 | 0.0187 | 3.2 | 3.1 | 0.198 | 1.34 | 0.146 | 1.13 | 34 | 100 | 101 |
| 10* | » | 0.194 | 0.0240 | 2.0 + 9 | 0.0189 | 3.1 | 5.1 | 0.206 | 1.5 | 0.15 | 0.7 | 21 | 97 | 103 |
| 11 | » | 0.180 | 0.0220 | 2.0 + 9 | 0.0182 | 2.9 | 5.0 | 0.181 | 1.5 | 0.154 | 0.675 | 22 | 92 | 99 |
|  |  | 0.197 | 0.0246 | 0 + 17.5 | 0.0190 | 2.5 | 4.5 | 0.192 | 1.46 | 0.150 | 0.98 | 30 | 97 | 98 |
| 12* | » | 0.202 | 0.0241 | 0.65 + 13 | 0.0193 | 2.65 | 4.65 | 0.206 | 1.37 | 0.147 | 0.78 | Unstable process | | |

*experiment with a HAW simulator; the simulator composition is given in Example 10.

As the above Examples show, the optimal result in the course of evaporating HAW resulted from reprocessing of NPS SNF is achieved through implementation of the two-stage process wherein at its start, after a technical stop, first the feed (HAW) and the water solution of the mixture of formaldehyde (taken in the form of formalin) and formic acid are dosed simultaneously to a model or stored bottoms solution, and after the stationary mode is achieved, the formic acid solution is used, reactant concentrations being selected in the claimed limits depending on a particular plant during a period of start-up and commissioning operations. This enables to achieve a nitric acid concentration in the bottoms solution at the level of 3.5 moles/L or lower for the bottoms solution specific volume of 0.4 m³/t of SNF with the burnup of 100 GW*day/t or more, avoiding crystallization of barium nitrate and formation of significant quantities of nitrous oxide which may hamper efficient gas purification.

The above-described examples and embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method for concentrating liquid radioactive waste resulted from extraction reprocessing of a burnt-up nuclear fuel of a nuclear power station, comprising:

performing a partial decomposition of nitric acid in a course of continuous evaporation while a solution containing a reducing agent is fed into a bottom part of a circulation-type evaporator, wherein a mixture of formaldehyde and formic acid is used as the reducing agent, wherein the method is conducted with aging the solution in the bottom part of the evaporator, wherein a water solution of a mixture of formaldehyde and formic acid or a solution of formic acid is fed as the reducing agent in 3-5 hours after the start of the method using the mixture of formaldehyde and formic acid, and wherein, when starting the method, the solution of formaldehyde and formic acid is used with a maximum formaldehyde content of 6.5 moles/L but not less than 0.65 moles/L, and a missing part thereof is replaced with formic acid in a quantity of 2.2-2.7 moles of formic acid instead of 1 mole of formaldehyde.

2. The method of claim 1, wherein an aging time period for aging the solution in the bottom part of the evaporator is at least 2 hours.

3. The method of claim 1, wherein a consumption of the reducing mixture in terms of formaldehyde is 0.3 moles per 1 mole of nitric acid in a radioactive aqueous waste (RAW) evaporated solution.

4. The method of claim 1, wherein an evaporation degree, with respect to dilution of a bottoms solution with a solution comprising the reducing agent, is limited by a solubility of barium nitrate at a nitric acid residual concentration in the bottoms solution not lower than 2.5 moles/L and a concentration of nitrate ion not less than 4 moles/L that is created by nitric acid and fission product salts contained in a highly active raffinate resulted from extraction reprocessing.

5. The method of claim 1, wherein the solution containing the reducing agent comprises water in a quantity of at least 0.35 kg per 1 L of the solution.

6. The method of claim 2, wherein an evaporation degree, with respect to dilution of a bottoms solution with a solution comprising the reducing agent, is limited by a solubility of barium nitrate at a nitric acid residual concentration in the bottoms solution not lower than 2.5 moles/L and a concentration of nitrate ion not less than 4 moles/L that is created by nitric acid and fission product salts contained in a highly active raffinate resulted from extraction reprocessing.

7. The method of claim 2, wherein the solution containing the reducing agent comprises water in a quantity of at least 0.35 kg per 1 L of the solution.

* * * * *